(12) United States Patent
Wu et al.

(10) Patent No.: US 9,297,969 B2
(45) Date of Patent: Mar. 29, 2016

(54) OPTICAL ENGINE ASSEMBLY AND TRANSCEIVER USING THE SAME

(71) Applicant: LINKWELL OPTO-ELECTRONICS CORPORATION, Taipei (TW)

(72) Inventors: Tsu-Hsiu Wu, Taipei (TW); Fang-Jeng Lin, Taipei (TW); Ann-Kuo Chu, Taipei (TW); Rong-Kuo Chiang, Taipei (TW)

(73) Assignee: Linkwell Opto-Electronics Corporation, Taipei (TW)

( * ) Notice: Subject to any disclaimer, the term of this patent is extended or adjusted under 35 U.S.C. 154(b) by 212 days.

(21) Appl. No.: 13/955,140

(22) Filed: Jul. 31, 2013

(65) Prior Publication Data
US 2014/0105612 A1    Apr. 17, 2014

(30) Foreign Application Priority Data

Oct. 16, 2012    (TW) .............................. 101138171 A

(51) Int. Cl.
*H04B 10/40* (2013.01)
*G02B 6/42* (2006.01)

(52) U.S. Cl.
CPC ............ *G02B 6/4214* (2013.01); *G02B 6/4292* (2013.01); *H04B 10/40* (2013.01); *G02B 6/421* (2013.01)

(58) Field of Classification Search
CPC ..... G02B 6/421; G02B 6/4214; G02B 6/4292
USPC ..................................................... 385/88–94
See application file for complete search history.

(56) References Cited

U.S. PATENT DOCUMENTS

| | | | | |
|---|---|---|---|---|
| 5,163,113 A * | 11/1992 | Melman | ........................ | 385/31 |
| 6,048,107 A * | 4/2000 | Pubanz | ........................ | 385/92 |
| 6,250,820 B1 * | 6/2001 | Melchior et al. | ................ | 385/89 |
| 6,821,027 B2 * | 11/2004 | Lee et al. | ........................ | 385/89 |
| 6,901,185 B2 * | 5/2005 | Sasaki et al. | .................... | 385/33 |
| 7,457,492 B2 * | 11/2008 | Umezawa | ....................... | 385/14 |
| 7,517,159 B1 * | 4/2009 | Rolston | ................ | G02B 6/4214 385/49 |
| 8,899,847 B2 * | 12/2014 | Lin et al. | ........................ | 385/89 |

FOREIGN PATENT DOCUMENTS

| | | |
|---|---|---|
| CN | 101017221 A | 8/2007 |
| CN | 101017228 A | 8/2007 |
| CN | 102692685 A | 9/2012 |
| JP | 06317724 A * | 11/1994 |
| TW | 200734707 A | 9/2007 |
| TW | 201237483 A | 9/2012 |
| TW | 201239435 A | 10/2012 |

OTHER PUBLICATIONS

English Abstracts and Bibliographic Information of Submitted References CN1010177221, CN1010177228 and CN102692685.

* cited by examiner

*Primary Examiner* — Daniel Petkovsek
(74) *Attorney, Agent, or Firm* — Rosenberg, Klein & Lee

(57) ABSTRACT

An optical engine assembly includes a bench, an optoelectronic device, a fixed member and a plurality of fibers. The bench has a bearing surface and an extended sidewall with a predetermined height from the bearing surface. The sidewall has an upper surface parallel to the bearing surface. The optoelectronic device is disposed on the center of the upper surface and includes a plurality of active areas. The fixed member is disposed on the bearing surface and has a plurality of through holes and two pin holes. The fibers respectively pass through the through holes and a 45-degree beveled surface is formed at the front end of each fiber. The 45-degree beveled surfaces are aligned with the active areas, respectively.

14 Claims, 5 Drawing Sheets

_US 9,297,969 B2_

OPTICAL ENGINE ASSEMBLY AND TRANSCEIVER USING THE SAME

CROSS REFERENCE TO RELATED APPLICATION

This application claims the priority benefit of Taiwan Patent Application Serial Number 101138171, filed on Oct. 16, 2012, the full disclosure of which is incorporated herein by reference.

BACKGROUND

1. Field of the Disclosure

This disclosure generally relates to a communication device and, more particularly, to an optical engine assembly and a transceiver using the same.

2. Description of the Related Art

Referring to FIG. 1, it shows a schematic diagram of a transmitter 9 in the conventional optical communication system, and the transmitter 9 includes a printed circuit board 91, an optoelectronic device 92 and a deflection device 93.

The optoelectronic device 92 is disposed on the printed circuit board 91 and electrically connected to a chip (not drawn herein) so as to convert the electric signals from the chip to optical signals and then emit the optical signal upward perpendicular to the printed circuit board 91. The deflection device 93 includes a plurality of optical fibers 931 whose front ends are formed with metal sputtered 45-degree beveled surfaces to reflect the optical signals from vertical to horizontal. The horizontal optical signals may be transmitted to an external transmission line via a connector (not drawn herein).

In the art, how to align the 45-degree beveled surfaces of the optical fibers 931 with the laser chips 921 of the optoelectronic device 92 is an important issue; and an accurate alignment can reduce the coupling loss such that the optical signals can have a better quality. However, as the printed circuit board 91 does not have good flatness (e.g. 100 μm normally), it is difficult to precisely align the optoelectronic device 92, which is directly disposed on the printed circuit board 91, in the following manufacturing process.

Accordingly, the present disclosure provides an optical engine assembly and a transceiver using the same in which the optoelectronic device is disposed on a metal bench having a simple structure thereby simplifying the manufacturing process and a good flatness thereby improving the alignment accuracy. The manufacturing cost is also reduced.

SUMMARY

The present disclosure provides an optical engine assembly and a transceiver using the same that may reduce the manufacturing cost, improve the manufacturing efficiency and improve the optical coupling efficiency.

The present disclosure further provides an optical engine assembly and a transceiver using the same that use a metal bench to bear optoelectronic devices thereby having high heat dissipation efficiency.

The present disclosure further provides an optical engine assembly and a transceiver using the same that use a metal bench having a simple structure to bear optoelectronic devices so as to simplify the manufacturing procedure.

The present disclosure further provides a transceiver that may transmit and receive optical signals and electrical signals simultaneously.

The present disclosure provides an optical engine assembly including a bench, an optoelectronic device, a fixed member and a plurality of optical fibers. The bench has a bearing surface and an extended sidewall with a predetermined height from an edge of the bearing surface. The extended sidewall has an upper surface parallel to the bearing surface. The optoelectronic device is disposed on a center of the upper surface and includes a plurality of active areas. The fixed member is disposed on the bearing surface and has a plurality of through holes and two pin holes. The optical fibers respectively pass through the through holes and a 45-degree beveled surface is formed at a front end of each of the optical fibers. The 45-degree beveled surfaces are aligned with the active areas, respectively.

The present disclosure further provides a transceiver including an optical engine assembly, a connector, a control chip, a substrate and a transmission line. The bench has a bearing surface and an extended sidewall with a predetermined height from an edge of the bearing surface. The extended sidewall has an upper surface parallel to the bearing surface. The optoelectronic device is disposed on a center of the upper surface and includes a plurality of active areas. The fixed member is disposed on the bearing surface and has a plurality of through holes and two pin holes. A plurality of optical fibers pass through the through holes respectively and a 45-degree beveled surface is formed at a front end of each of the optical fibers. The 45-degree beveled surfaces are aligned with the active areas, respectively. The connector is disposed on the bearing surface and has two dowel pins configured to insert into the two pin holes of the fixed member. The control chip is coupled to the optoelectronic device. The optical engine assembly and the control chip are disposed on the substrate. The transmission line has a plurality of transmission fibers and a plurality of copper wires. The transmission fibers are respectively optically coupled to the optical fibers of the optical engine assembly via the connector and the copper wires are electrically connected to a circuit layout on the substrate.

The present disclosure further provides a transceiver including a printed circuit board, a control chip, an optical engine assembly and a transmission line. The control chip is disposed on the printed circuit board and is configured to generate or receive electrical signals. The optical engine assembly is disposed on the printed circuit board and coupled to the control chip and is configured to generate or receive optical signals. The transmission line is coupled to the optical engine assembly and the printed circuit board and includes 4 transmission fibers and 7 copper wires, wherein the 4 transmission fibers are configured to transmit the optical signals with transition minimized differential signaling (TMDS) data and the 7 copper wires are configured to transmit the electrical signals.

In an embodiment, the bench is made of metal materials such as zinc alloy or copper alloy.

In an embodiment, the connector is a standard MT connector.

In the optical engine assembly and the transceiver using the same according to the present disclosure, the number of optical fibers included by the optical engine assembly and the transmission line is determined according to the data format to be transmitted, e.g. 4 optical fibers may be included for transmitting TMDS data when high-definition multimedia interface (HDMI) data is transmitted. In other embodiments, one optical fiber may be used to transmit TMDS data.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
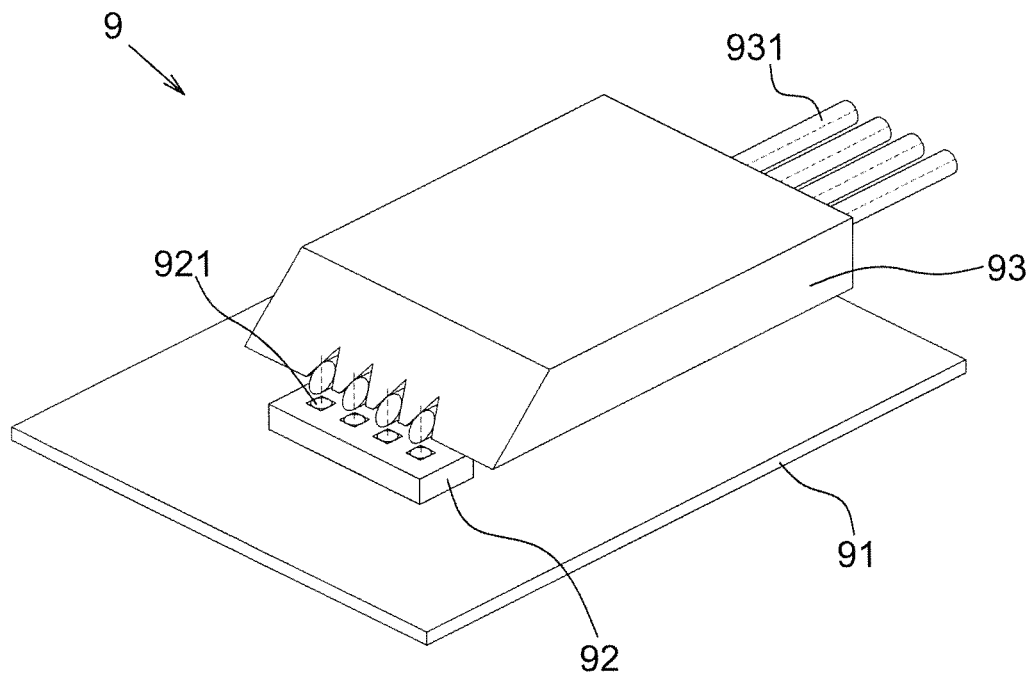
FIG. 1 shows a schematic diagram of the transmitter of the conventional optical fiber communication system.
Figure 2:
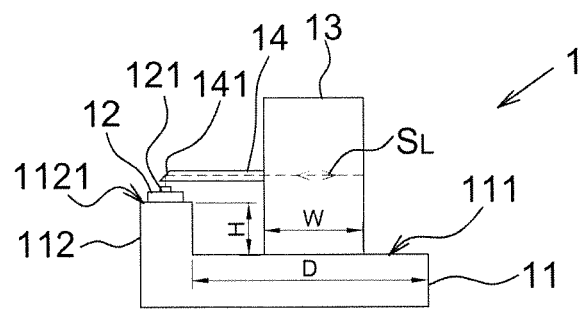
FIG. 2 shows a side view of the optical engine assembly according to an embodiment of the present disclosure.

Referring to FIG. 2, it shows a schematic diagram of the optical engine assembly according to an embodiment of the present disclosure. The optical engine assembly 1 is connected to a transmission line via a standard multi-terminal (MT) connector (described later) so as to send optical signals to the transmission line or receive optical signals from the transmission line. The optical engine assembly 1 includes a bench 11, an optoelectronic device 12, a fixed member 13 and a plurality of optical fibers 14.

The bench 11 is configured to bear the optoelectronic device 12 and the fixed member 13. The bench 11 includes a bearing surface 111 and an extended sidewall 112 with a predetermined height H from an edge (e.g. the left edge shown in the figure) of the bearing surface 111. The sidewall 112 has an upper surface 1121 parallel to the bearing surface 111. In this embodiment, the bench 11 is made of metal materials such as zinc alloy or copper alloy. For example, the bench 11 may be manufactured by compression molding or metal injection molding so as to obtain high flatness (within 10 μm).

Figure 3A:
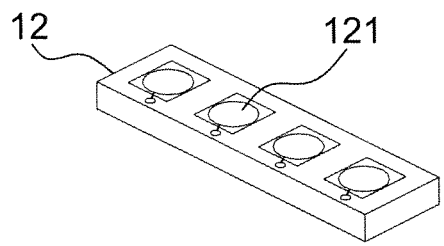
FIG. 3A shows a perspective view of the optoelectronic device of the optical engine assembly according to the embodiment of the present disclosure.

The optoelectronic device 12 is disposed on a center of the upper surface 1121 of the extended sidewall 112 and includes a plurality of active areas 121 (as shown in FIG. 3A), and the active areas 121 may be laser chips configured to convert electrical signals to optical signals or photodetectors configured to detect optical signals and convert the optical signals to electrical signals. The number of the active areas 121 is determined according to the number of channels needed by the communication system, e.g. 4 channels shown herein. In an embodiment, a part of the plurality of optoelectronic devices 12 may be photodetectors and the others may be laser chips so as to form a transceiver of the communication system.

Figure 3B:
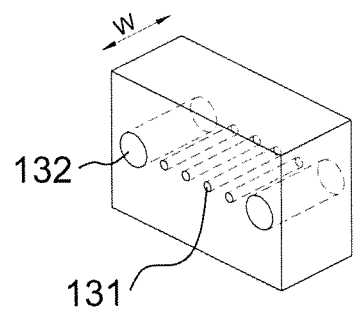
FIG. 3B shows a perspective view of the fixed member of the optical engine assembly according to the embodiment of the present disclosure.

The fixed member 13 is disposed on the bearing surface 111 and includes a plurality of through holes 131 and two pin holes 132. An extended direction of the fixed member 13 is preferably parallel to the bearing surface 111 and has a width W (as shown in FIG. 3B); wherein the plurality of through holes 131 are configured to fix the optical fibers 14 therein and the two pin holes 132 are configured to be inserted by two dowel pins (described later) of a standard MT connector so as to combine with the standard MT connector. In this embodiment, a pitch of the plurality of through holes 131 is, for example, 250 μm to match the standard MT connector. The prescribed pitch may be customized according to different applications. In an embodiment, the fixed member 13 may be manufactured by injection molding, and the through holes 131 and the two pin holes 132 are corresponding to the standard MT connector. In another embodiment, the fixed member 13 may be a part of the standard MT connector (e.g. made by cleaving the standard MT connector) such that the through holes 131 and the two pin holes 132 correspond to the standard MT connector. Similarly, the number of the through holes 131 is determined according to the number of the required channels.

In an embodiment, a depth D of the bearing surface 111 from the sidewall 112 is preferably larger than the width W of the fixed member 13, e.g. about 1 mm difference, so as to be convenient for assembling.

The optical fibers 14, for example, may be bare fibers; each of the optical fibers 14 passes through the through holes 131 and an front end of each of the optical fibers 14 forms a 45-degree beveled surface 141 configured to deflect optical signals $S_L$. Therefore, the 45-degree beveled surfaces 141 are aligned with the active areas 121 respectively. In addition, for improving a reflection coefficient of the 45-degree beveled surfaces 141, one or a plurality of layers of metal or dielectric film(s) may be coated thereon.

Figure 4A:
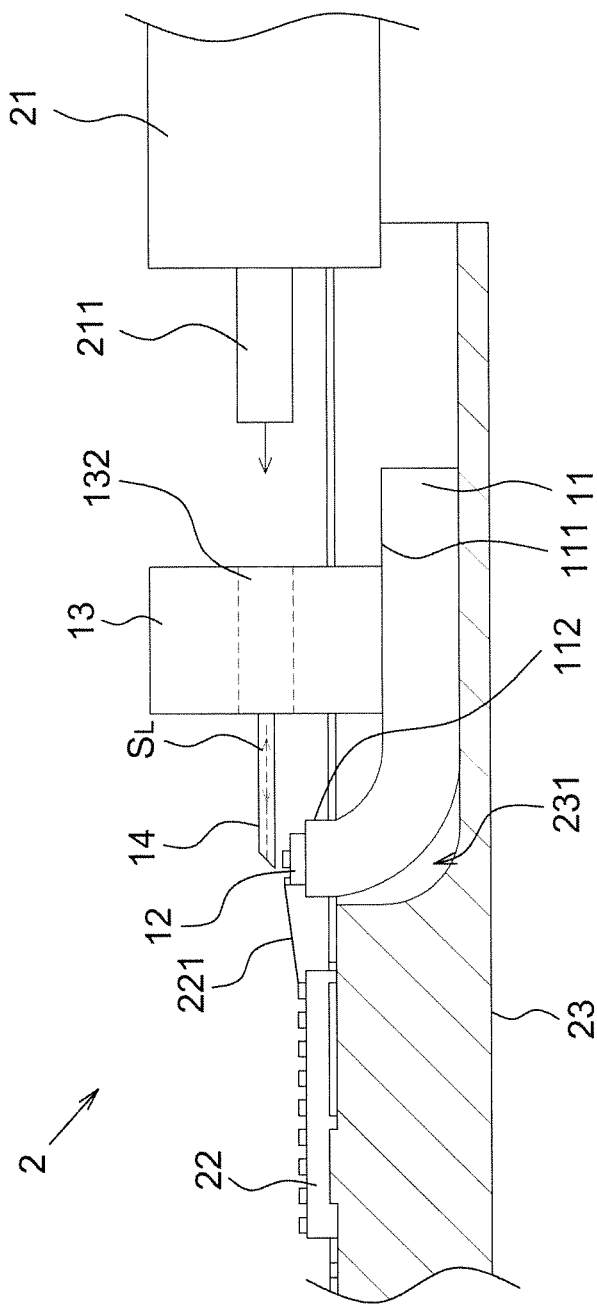
FIG. 4A shows a side view of the transceiver according to an embodiment of the present disclosure.
Figure 4B:
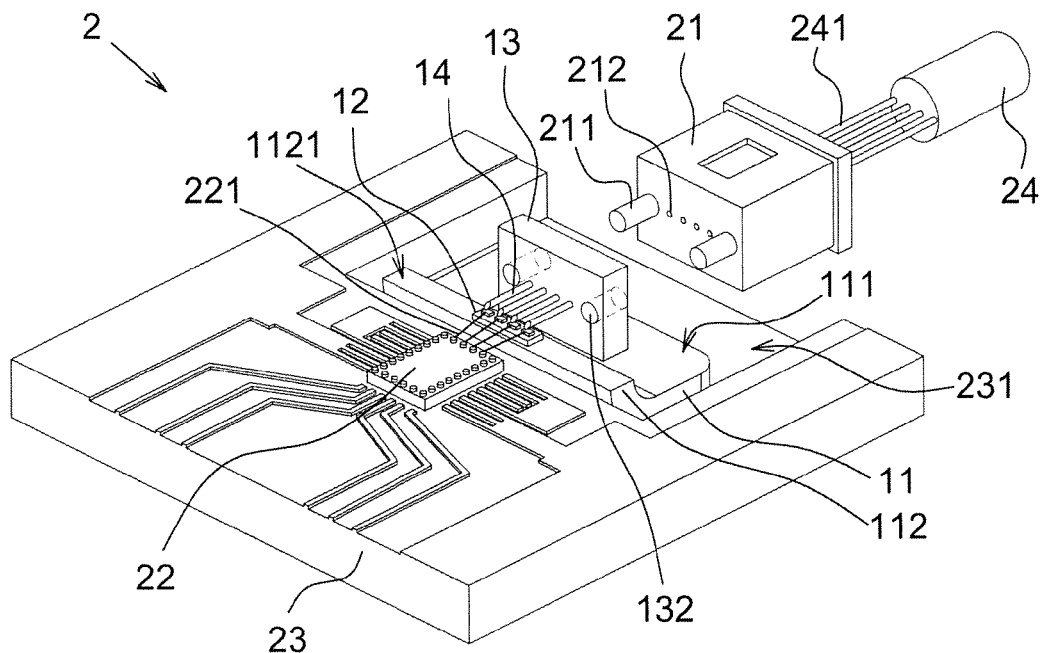
FIG. 4B shows a perspective view of the transceiver according to an embodiment of the present disclosure.

Referring to FIG. 4A and FIG. 4B, FIG. 4A shows a side view of the transceiver according to an embodiment of the present disclosure; FIG. 4B shows a perspective view of the transceiver according to an embodiment of the present disclosure. The transceiver 2 according to this embodiment is configured to transmit the optical signals $S_L$ generated by the optical engine assembly 1 shown in FIG. 2 to a transmission line via a standard MT connector or receive the optical signals $S_L$ from the transmission line to the optical engine assembly 1 via the standard MT connector.

The transceiver 2 includes the optical engine assembly 1, a connector 21, a control chip 22, a substrate 23 and a transmission line 24; wherein the optical engine assembly 1 and the control chip 22 are disposed on the substrate 23. The substrate 23 may be a printed circuit board (PCB) and a circuit layout if formed thereon according to operating requirements. As shown in FIG. 2, the optical engine assembly 1 includes the bench 11, the optoelectronic device 12, the fixed member 13 and the optical fibers 14, and thus redundant explanation is omitted herein. In addition, the substrate 23 preferably includes a recess 231 configured to accommodate the optical engine assembly 1 so as to shorten a distance between the optoelectronic device 12 and the control chip 22 thereby shortening the wire bonding length. However, the recess 231 may not be implemented according to different applications. In an embodiment, the recess 231 is made by mechanical work.

The connector 21 may be a standard MT connector, and a part of the connector 21 is mounted on the bearing surface 111 of the optical engine assembly 1. The connector 21 has two dowel pins 211 configured to insert into the two pin holes 132 of the fixed member 13 for combination. As mentioned above, the connector 21 has a plurality of fixed holes 212 corresponding to the through holes 131 of the fixed member 13 for external fibers 241 to insert therein. When the connector 21 is combined with the fixed member 13 through the two dowel pins 211 and secured on the bearing surface 111, the above-mentioned external fibers 241 are optically coupled to a side of the optical fibers 14 away from the 45-degree beveled surface 141. It is appreciated that the fixed member 13 and the connector 21 may be made according to practical applications as long as they are matched to each other; i.e., the connector 21 may not be a standard MT connector.

The control chip 22 may be coupled to the optoelectronic device 12 via wire bonding or a circuit layout on the substrate 23. More specifically speaking, the control chip 22 is electrical connected to the active areas 121 of the optoelectronic device 12. When the active areas 121 are laser chips, the laser chips covert electrical signals from the control chip 22 to optical signals and emit the optical signals to the 45-degree beveled surface 141 of the optical fibers 14 along the direction perpendicular to the bearing surface 111. When the active areas 121 are photodetectors, the photodetectors convert optical signals from the optical fibers 14 to electrical signals and then send the electrical signals to the control chip 22 for processing.

Figure 5:
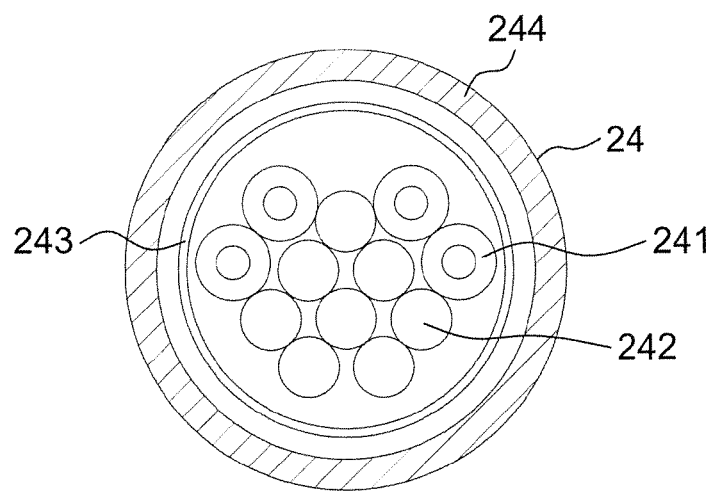
FIG. 5 shows a cross-sectional view of the transmission line coupled to the transceiver according to the embodiment of the present disclosure.
Figure 6:
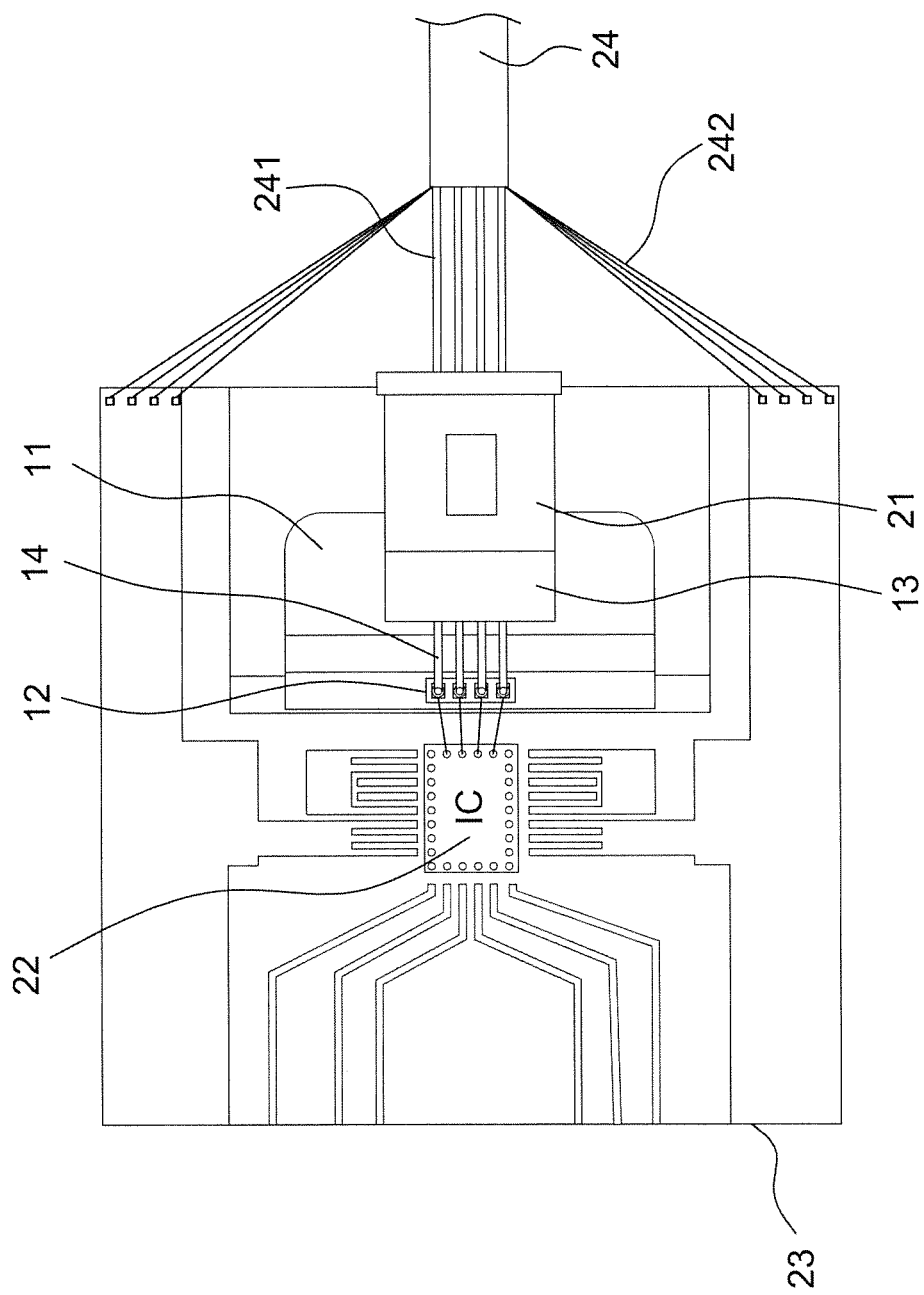
FIG. 6 shows a top view of the transceiver according to an embodiment of the present disclosure.

Referring to FIG. 5, it shows a cross-sectional view of the transmission line coupled to the transceiver according to the embodiment of the present disclosure. The transmission line 24 has a plurality of transmission fibers 241 (i.e. the above-mentioned external fibers) and a plurality of copper wires 242. The transmission fibers 241 may pass through and fix inside the fixed holes 212 of the connector 21 so as to be respectively optically coupled to the optical fibers 14 of the optical engine assembly 1 via the connector 21. The copper wires 242 are electrically connected to a circuit layout on the substrate 23 (as shown in FIG. 6) so as to electrically connected to the control chip 22 through the circuit layout. Accordingly, the control chip 22 may send or receive electrical signals via the copper wires 242 and send or receive optical signals via the optical engine assembly 1, the connector 21 and the transmission fibers 241. It is appreciated that front ends (the ends facing the fixed member 13) of the transmission fibers 241 are grinded and polished for optical coupling.

The number of the transmission fibers 241 and the copper wires 242 included in the transmission line 24 may be arranged according to the communication data transmitted by the transmission system. For example, when the transceiver 2 of this embodiment is configured to transmit and receive high-definition multimedia interface (HDMI) data, the transmission line 24 may include 4 transmission fibers 241 and 7 copper wires 242 (as shown in FIG. 5), wherein the 4 transmission fibers 241 may transmit the data of TMDS 0, TMDS 1, TMDS 2 and TMDS CLK respectively, and the 7 copper wires 242 may transmit the data except the TMDS signals. In addition, the transmission line 24 may further include a shielding layer configured to shield the electromagnetic interference (EMI) from the copper wires 242 and a protection layer 244 for covering the outmost layer of the transmission line 24. In addition, the TMDS signals may also be transmitted by using only one transmission fiber 241 according to different modulation methods.

In other words, when the transceiver 2 of this embodiment is configured to transmit and receive HDMI data, the optical engine assembly 1 and the control chip 2 are both disposed on a printed circuit board; the control chip 2 is configured to generate or receive electrical signals (e.g. the data except the TMDS signals); and the optical engine assembly 1 is coupled to the control chip 22 and configured to generate or receive optical signals (e.g. the TMDS signals). The transmission line 24 is optically coupled to the optical engine assembly 1 and electrically coupled to the printed circuit board 23. The transmission line 24 includes at least one (e.g. 4 shown herein) transmission fiber configured to transmit optical signals containing the TMDS data and 7 copper wires configured to transmit electrical signals without containing the TMDS data (as shown in FIG. 6).

In addition, it is appreciated that the combination between different components according to the embodiment of the present disclosure may be implemented by using glue.

As mentioned above, in a transmitter of the conventional optical communication system, optoelectronic devices are directly disposed on a printed circuit board such that the optical coupling efficiency is difficult to be controlled within a satisfactory range due to the poor flatness of the printed circuit board. The present disclosure further provides an optical engine assembly (FIG. 2) and a transceiver using the same (FIG. 4B and FIG. 6) that use a metal bench having a simple structure for bearing the optoelectronic devices so as to simplify the manufacturing procedure and reduce the manufacturing cost. In addition, according to the characteristic of the metal bench, the optical engine assembly and the transceiver using the same of the present disclosure further have high heat dissipation efficiency and good optical coupling efficiency.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical engine assembly, comprising:
   a bench comprising a bearing surface and an extended sidewall with a predetermined height from an edge of the bearing surface, the extended sidewall having an upper surface parallel to the bearing surface;
   an optoelectronic device disposed on a center of the upper surface and comprising a plurality of active areas;
   a fixed member disposed on the bearing surface and comprising a plurality of through holes and two pin holes, wherein the fixed member is a part of a standard MT connector made by cleaving the standard MT connector; and
   a plurality of optical fibers respectively passing through the through holes, a front end of each of the optical fibers forming a 45-degree beveled surface and respectively aligned with the active areas.

2. The optical engine assembly as claimed in claim 1, wherein the bench is made of zinc alloy or copper alloy.

3. The optical engine assembly as claimed in claim 2, wherein the active areas are laser chips or photodetectors.

4. The optical engine assembly as claimed in claim 2, wherein a pitch of the through holes of the fixed member is 250 μm; and the optical fibers are bare fibers.

5. The optical engine assembly as claimed in claim 1, wherein the active areas are laser chips or photodetectors.

6. The optical engine assembly as claimed in claim 1, wherein a pitch of the through holes of the fixed member is 250 μm; and the optical fibers are bare fibers.

7. A transceiver, comprising:
   an optical engine assembly, comprising:
      a bench comprising a bearing surface and an extended sidewall with a predetermined height from an edge of the bearing surface, the extended sidewall having an upper surface parallel to the bearing surface;
      an optoelectronic device disposed on a center of the upper surface and comprising a plurality of active areas;
      a fixed member disposed on the bearing surface and comprising a plurality of through holes and two pin holes, wherein the fixed member is a part of a standard MT connector made by cleaving the standard MT connector; and a plurality of optical fibers respectively passing through the through holes, a front end of each of the optical fibers forming a 45-degree beveled surface and respectively aligned with the active areas;

a connector disposed on the bearing surface and comprising two dowel pins configured to insert into the two pin holes of the fixed member;

a control chip coupled to the optoelectronic device;

a substrate on which the optical engine assembly and the control chip are disposed; and a transmission line comprising a plurality of transmission fibers and a plurality of copper wires, the transmission fibers respectively optically coupled to the optical fibers of the optical engine assembly via the connector, and the copper wires electrically connected to a circuit layout on the substrate.

8. The transceiver as claimed in claim 7, wherein the connector is another standard MT connector.

9. The transceiver as claimed in claim 8, wherein the transmission line comprises 4 transmission fibers and 7 copper wires.

10. The transceiver as claimed in claim 7, wherein the bench is made of zinc alloy or copper alloy.

11. The transceiver as claimed in claim 10, wherein the transmission line comprises 4 transmission fibers and 7 copper wires.

12. The transceiver as claimed in claim 7, wherein the substrate further comprises a recess configured to dispose the optical engine assembly.

13. The transceiver as claimed in claim 12, wherein the transmission line comprises 4 transmission fibers and 7 copper wires.

14. The transceiver as claimed in claim 7, wherein the transmission line comprises 4 transmission fibers and 7 copper wires.

* * * * *